United States Patent [19]

Weichman

[11] 4,413,033

[45] Nov. 1, 1983

[54] WIRE CARRIER AND EDGE PROTECTOR TRIM STRIP FORMED THEREFROM

[75] Inventor: Edward C. Weichman, Rock Hill, S.C.

[73] Assignee: Schlegel Corporation, Rochester, N.Y.

[21] Appl. No.: 385,798

[22] Filed: Jun. 7, 1982

[51] Int. Cl.³ .......................... E04F 19/02; E06B 7/22
[52] U.S. Cl. ...................................... 428/122; 49/490; 52/716; 428/358
[58] Field of Search .................. 428/122, 358; 49/490; 52/716

[56] References Cited

U.S. PATENT DOCUMENTS

| | | | |
|---|---|---|---|
| 3,198,689 | 8/1965 | Lansing | 428/122 X |
| 4,188,765 | 2/1980 | Jackson | 428/122 X |
| 4,343,845 | 8/1982 | Burden et al. | 428/122 |

Primary Examiner—Henry F. Epstein
Attorney, Agent, or Firm—Cumpston & Shaw

[57] ABSTRACT

An improved channel-shaped wire carrier is coated with elastomeric material to form an edge protector trim strip of substantially U-shaped transverse cross section. The wire carrier is formed from a continuous metallic wire looped to form looped ends adjacent the edges of the carrier joined by transversely extending lengths of wire spaced from one another longitudinally of the carrier. A plurality of strands of material extend longitudinally of the carrier and are interwoven with the wires to maintain the spaced relation thereof. At least two of the strands are located along the looped ends at each edge of the carrier and are forced together by the curvature of the looped ends prior to the coating operation to form at least a pair of grouped edge strands. The remaining strands are located only along intermediate portions of the base and side flanges of the channel-shaped wire carrier.

2 Claims, 5 Drawing Figures

U.S. Patent   Nov. 1, 1983   Sheet 1 of 2   4,413,033
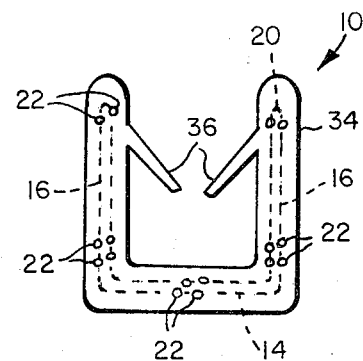
FIG. 2
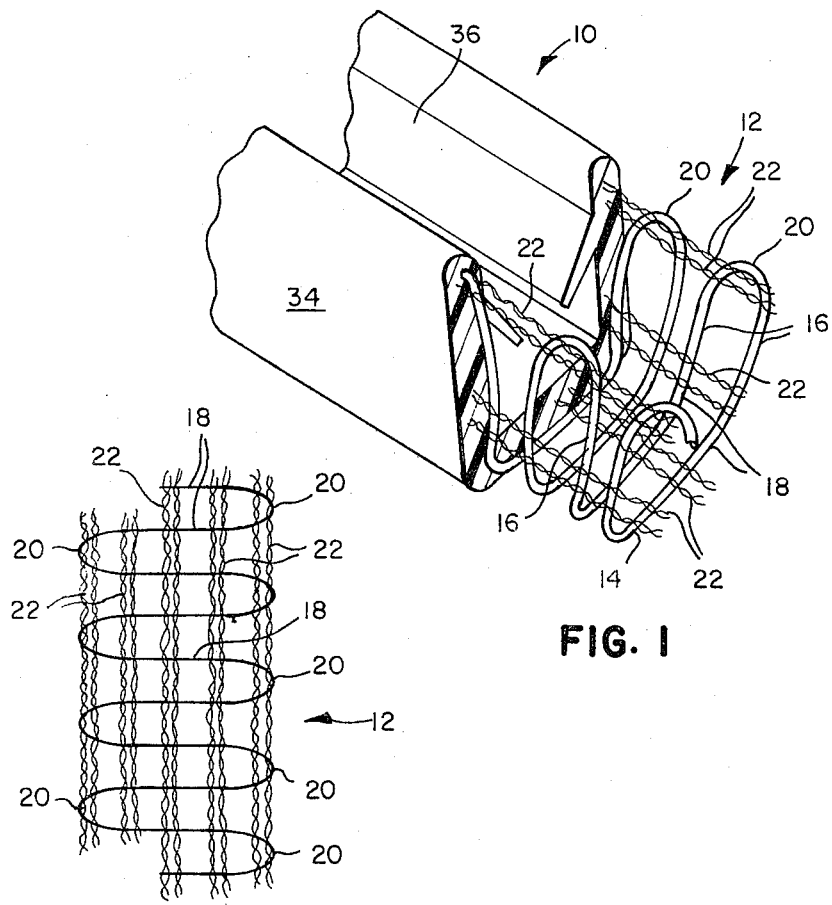
FIG. 3
FIG. 1

WIRE CARRIER AND EDGE PROTECTOR TRIM STRIP FORMED THEREFROM

BACKGROUND OF THE INVENTION

1. Field of the Invention

This invention relates in general to wire carriers and edge protector trim strips formed therefrom. More particularly, this invention relates to an improved wire carrier in which the strands of material interwoven with the wire are selectively positioned transversely of the carrier. Selective positioning of the strands achieves increased resistance of the carrier to hydraulic deformation during extrusion of an elastomeric material onto the carrier. Selective strand positioning also minimizes damage to center strands of material when the carrier is formed or bent into a channel-shaped carrier.

2. Description of the Prior Art

Lansing, U.S. Pat. No. 3,198,689 discloses an edge protector trim strip comprising a flat wire carrier formed from a continuous wire looped to form lengths extending transversely and spaced from one another longitudinally of the strip. The wire lengths are stayed and maintained in their spaced relation with one another by interweaving with them a plurality of strands of material randomly located transversely of the wire lengths from one edge to the other. In Lansing, the wire carrier is coated with an elastomeric material while in a flat condition. After the coating operation, the flat coated wire carrier is formed by form rolls into a trim strip of substantially U-shaped transverse cross section.

During the trim strip forming step, the strands of material located at the bends or corners of the U-shaped strip are embedded in elastomeric material and hence are not damaged by the form rolls. Other problems arose, however, such as subjecting the elastomeric material in the bent areas of the trim strip to continuous stress in its relaxed state resulting, for example, in reduced useful life of the trim strip. To overcome this problem, the trim strip manufacturing process was changed by feeding the flat, uncoated wire carrier through form rolls to form a channel-shaped wire carrier of substantially U-shape transverse cross section. The formed wire carrier was then fed through an extruder where an elastomeric material was coated onto the wire carrier to form a trim strip in which the elastomeric material is free from stress in its relaxed state. Although the changed manufacturing process solved one problem, another problem developed which still persists, namely damage to strands of material located in the bend areas of the carrier during the carrier forming operation. This problem was made more difficult by the tendency of the woven strands to slide laterally or sidewise on the wire lengths into the bend areas.

Still another long standing, persistent problem resulting from the above change in manufacturing operation was a reduction in the stability of the wire carrier during the elastomeric extruding operation, particularly along the edges thereof, resulting in the formation of a defective trim strip, or strip of lower quality. The hydraulic forces generated during the extrusion process cause the wire carrier to deform by, for example, the looped ends thereof bending back as they pass through the extruder. This wire carrier deformation or distortion is increased if the single strand along each edge inadvertently slides toward the center of the wire carrier.

SUMMARY OF THE INVENTION

In accordance with this invention, there is provided an improved wire carrier incorporated in an edge protector trim strip for effectively overcoming the aforementioned long standing problems inherent in the manufacture of edge protector trim strips. These problems have been solved in a simple, convenient and highly effective way by selectively repositioning the strands while retaining the same number of overall strands for longitudinal strength purposes. Two or more of the strands are located on the looped ends of the wire carrier where the curvature of the wire at the looped ends causes the strands to be forced outwardly and to be grouped together along the edges of the wire carrier. By virtue of locating the two or more strands along the looped ends where the greatest distortion is likely to occur, fewer strands are needed in the center area. The center strands are located transversely of the wire carrier intermediate the base and side flanges of the channel-shaped carrier such that even with a certain amount of lateral or sideways sliding of the strands on the wire, the likelihood of the strands moving into the bend area where they could be damaged is minimized, if not eliminated.

The improved wire carrier comprises a continuous metallic wire looped to form looped ends at the edges of the carrier joined by lengths of wire extending transversely and spaced from one another longitudinally of the carrier. The wire carrier is fed through form rolls which form the wire carrier into a channel-shaped carrier of substantially U-shaped transverse cross section having a base and opposite side flanges. A plurality of strands of material extend longitudinally of the carrier and are interwoven with the wires to maintain the wire lengths in spaced relation. At least two of the strands are located along the looped ends at each edge of the wire carrier, and are forced together by the curvature of the looped ends to form grouped edge strands. The remaining strands are located only along intermediate portions of the base and side flanges of the carrier so that none of the strands are located at the bend areas or corners of the U-shaped carrier.

An advantage of the present invention is to provide, among other things, manufacture of edge protector trim strips of improved quality and increased strength or resistance to longitudinal stretching. Another advantage is to improve carrier stability during the extrusion process so that the carrier effectively resists hydraulic deformation of the wire carrier and prevents layback or the bending back of the looped ends of the carrier. Still another advantage of this invention is to substantially eliminate damage to center strands during the process step of forming the wire carrier into a channel-shaped carrier.

The invention and its advantages will become more apparent from the detailed description of the invention presented below.

BRIEF DESCRIPTION OF THE DRAWINGS

The details of the invention will be described in connection with the accompanying drawings, in which:

FIG. 1 is a perspective view of a portion of an edge protector trim strip embodying the principles of this invention, the trim strip further having the coating removed at one end thereof to show the wire carrier;

FIG. 2 is a section view taken along line 2—2 of FIG. 1;

FIG. 3 is a top plan view of a portion of the flat wire carrier before being bent into a channel-shaped carrier;

DETAILED DESCRIPTION OF THE INVENTION

Figure 4:
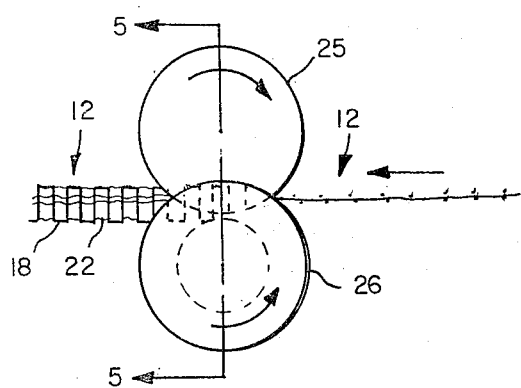
FIG. 4 is a side elevational view of a pair of forming rolls for bending the wire carrier into a channel-shaped carrier.

With reference to FIGS. 1–3, a preferred embodiment of an edge protector trim strip 10 of this invention is disclosed. The trim strip 10 comprises a bendable supporting channel-shaped wire carrier 12 of substantially U-shape in transverse section, having a base 14 and opposite side flanges 16. The wire carrier 12 is formed by lengths of metal wires 18 extending transversely of the carrier and in spaced relation with one another longitudinally thereof, as shown. These lengths of wire 18 are preferably provided by a continuous wire having looped ends 20 joined together by the transversely extending wire lengths 18. The wire may, for example, be formed of a tempered carbon steel having a tensile strength between 125,000 and 155,000 p.s.i. and a diameter of about 0.03 inch. Such wire is of sufficient rigidity to jointly maintain the channel shape of the trim strip, subject to bending of the wires individually, to enable the trim strip as a whole to be readily bent to conform to and fit differently curved edges of structural flanges. The multiplicity of wires, acting in unison, maintain the channel shape of the trim strip and support the coating and clamping fins hereinafter described, while the individual wire lengths yield sufficiently to provide the desired flexibility required of the trim strip.

The wire lengths 18 are preferably stayed and maintained in their spaced relation with one another by interweaving with them a plurality of strands 22 of material. The material may be of any suitable type such as polyester, cotton, fiberglass or light wire, for example, capable of maintaining the spacing between the wires of the wire carrier 12 without interfering materially with its flexibility.

Figure 5:
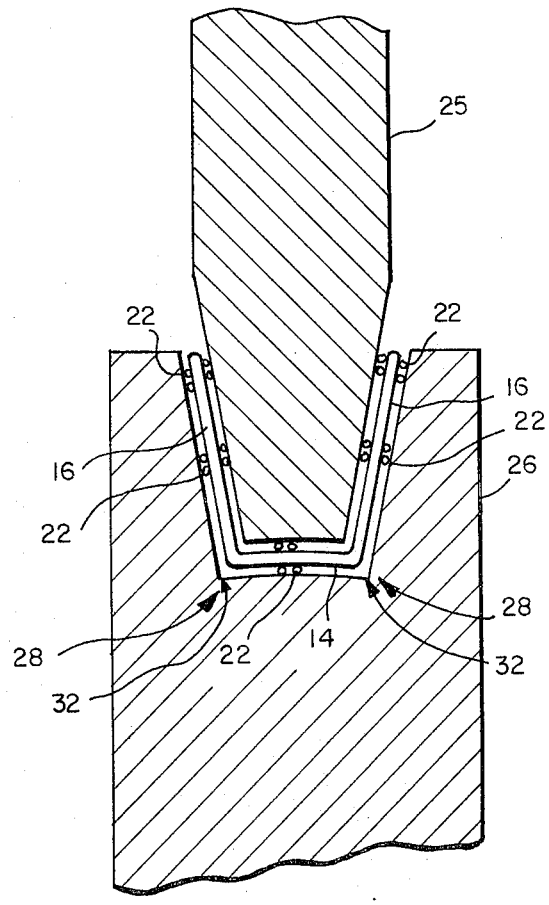
FIG. 5 is an enlarged view of the forming rolls taken substantially along line 5—5 of FIG. 4.

With reference to FIGS. 3–5, the practice heretofore has been to utilize about 10 strands 22 of material distributed randomly along the wire lengths 18 of a flat wire carrier 12 with one of the strands along each edge of the carrier. The flat wire carrier 12 is then fed through form rolls 25, 26 for bending the wire carrier into a channel shape. Since the strands 22 tend to slide laterally or sidewise on the wire lengths 18, the likelihood was high of one or more of the strands being located in or moving into a bend area 28 of the wire carrier and being damaged during the carrier bending operation. Also, there was some likelihood that the single strand, located along each edge of the wire carrier, would slide out of position. This inadvertent sliding of the edge strands coupled with the inability of the single strand, due to stretching or the like, from preventing the looped ends of the carrier from bending back under the hydraulic forces generated during the extrusion process, could result in the formation of a defective trim strip, or one of reduced quality.

The aforementioned problems have been overcome in this invention by utilizing the same number of strands 22 for longitudinal strength purposes, but selectively positioning the strands, as best seen in FIG. 3. Two or more of the strands 22 are located at the looped ends 20 along the edges of the wire carrier 12. The curvature of the looped ends 20 tends to cause the edge strands 22 to move outwardly to form at least a pair of closely grouped edge strands. The remaining strands 22 are located along intermediate portions of base 14 and side flanges 16, as best seen in FIG. 5. Accordingly, even allowing for some sliding of strands 22 along wire lengths 18, the likelihood is very low that any strands would enter the bend areas 28 of wire carrier 12 and be damaged by the interacting corners 30, 32 of the form rolls 25, 26, respectively.

The wire carrier 12 so formed is fed through any known and suitable extrusion apparatus and process, not shown, for coating an elastomeric or plastic material 34 or the like onto both side faces and edges of wire carrier 12 to form an edge protector trim strip 10. The coating 34 on the interior face of the wire carrier is formed with fins 36 extending longitudinally of carrier 12 and projecting obliquely inwardly of the carrier and toward its base 14. The trim strip, so formed, is readily pressed down over the free edge of a structural flange causing the fins to deflect inward slightly. Any force tending to remove the trim strip causes the fins to frictionally engage the sides of the flange and resist removal of the trim strip.

While a presently preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A bendable substantially U-shaped wire carrier for use in forming an edge protector trim strip when coated with an elastomeric material comprising:

a continuous metallic wire looped to form looped ends at the edges of said U-shaped carrier, said looped ends being joined by lengths of wire extending transversely and spaced from one another longitudinally of said carrier, each of said lengths of wire forming a base and side flanges joined by substantially right angle corners;

a plurality of strands of material extending longitudinally of said carrier and selectively interwoven with said base and side flanges only of said wires to maintain the spaced relation thereof with said corners free of strands; and at least two of said strands being located along said looped ends at each edge of said carrier and forced together by the curvature of said looped ends to form at least a pair of grouped edge strands.

2. An edge protector trim strip adapted to be immovably clamped and supported on the edge of a structural body flange to enclose and trim the same comprising:

a bendable supporting wire carrier of substantially U-shape in transverse section for embracing and enclosing the edge of said body flange;

said wire carrier having a base and opposite side flanges joined to said base to form substantially right angle corners of said carrier;

said wire carrier further being formed from a continuous metallic wire looped to form looped ends adjacent the edges of said carrier which are joined by lengths of wire extending transversely and spaced from one another longitudinally of said carrier;

a plurality of strands of material extending longitudinally of said carrier and selectively interwoven with said wires to maintain the spaced relation thereof, at least two of said strands being located along said looped ends at each edge of said carrier and forced together by the curvature of said looped ends to form at least a pair of grouped edge strands, the remainder of said plurality of strands being selectively located only along intermediate portions of said base and side flanges whereby said corners are free of strands; and a coating of flexible, resilient elastomeric material on said wire carrier covering inner and outer sides and said edges of said carrier flanges, said coating being formed at the inner side of said carrier flanges with resilient and compressible fins extending longitudinally of said carrier and adapted to project obliquely inwardly of said carrier and toward said base thereof for contact with opposite side faces of said body flange to resist removal of said strip therefrom by compressive wedging engagement therewith.

* * * * *